UNITED STATES PATENT OFFICE.

JAMES O. HANDY, OF PITTSBURGH, PENNSYLVANIA, ASSIGNOR TO PITTSBURGH TESTING LABORATORY, OF PITTSBURGH, PENNSYLVANIA, A CORPORATION OF PENNSYLVANIA.

PROCESS OF TREATING USED LUBRICANTS.

1,295,308.   Specification of Letters Patent.   Patented Feb. 25, 1919.

No Drawing.   Application filed February 16, 1918.   Serial No. 217,643.

*To all whom it may concern:*

Be it known that I, JAMES O. HANDY, a resident of Pittsburgh, Allegheny county, Pennsylvania, have invented a new and useful Improvement in Processes of Treating Used Lubricants, of which the following is a full, clear, and exact description, My invention is designed to provide an economical, simple and effective process by which used lubricants, such for example, as those which have been used in lubricating explosive engines, may be regenerated, although the invention is applicable to used lubricants from various other sources.

Such used oils or lubricants usually contain tarry or asphaltic material produced by oxidation during service and usually acid bodies and unsaturated hydrocarbons formed by exposure to heat and air. There is usually also some free carbon in suspension as well as dust and dirt of various origins. Water may also be present to some extent.

My invention is designed to eliminate these various impurities or foreign substances and to restore the oil or lubricant to substantially its original condition.

In carrying out my invention in its preferred form, I first clarify the oil or lubricant either by settling or centrifuging for the purpose of removing suspended matter. This will largely remove the free carbon, miscellaneous dirt, and at least a considerable portion of the water. If there is water still remaining, the oil or lubricant is then treated with a drying agent, such as caustic lime or burned dolomite, which will remove all traces of moisture which would otherwise dilute the sulfuric acid used in the further treatment and hinder its complete action.

The lubricant is then given a decolorizing treatment. Preferably this is done by shaking with bone black, fullers' earth, or other similar material, which will act by absorption. This decolorizing step may, however, be carried out at the same time as the treatment with the caustic lime or burned dolomite for removing moisture.

The material is then treated with concentrated sulfuric acid, the amount of acid used being preferably about one to two per cent. of the original weight of the oil. This acts to break up the tar or resinous compounds present in the oil. The acid and the products of its action are then removed by settling (combined with filtering, if desired). Any traces of sulfuric acid or sulfur dioxid then remaining in the oil are removed by agitating with hydrated lime or caustic lime, preferably the former. The excess lime, together with the products of its action, are then filtered off. The oil is now ready for re-use.

Some portion of the purified oil which is retained mechanically by the lime or adsorbent material residue can be recovered by washing with hyrdocarbon solvent. The oil thus recovered from any of the earlier residues may be returned through the series of operations, and further purified together with the main body of oil.

The operations as before described, together with the order thereof, may be considerably modified. Thus, the operations may be considerably shortened, especially where moisture is not present. The settling or centrifuging may be omitted and the decolorizing step may be directly followed by the treatment with sulfuric acid, or the adsorbent material may be added with the acid or before drawing it off, the final operation being the treatment with lime. While lime is the most convenient reagent, I may use instead caustic soda or caustic potash when conditions permit.

All of the operations may be carried on without any dilution of the lubricant with a hydrocarbon solvent. I may, however, use such solvent where special conditions render this advisable, for the purpose of expediting the operations and producing a product refined to a noticeably greater degree. The use of such a solvent is more fully described and claimed in my Patents Nos. 1,281,354 and 1,281,355, dated October 15, 1918. With many kinds of used lubricants, however, I have found that this step may be entirely omitted and a recovered product produced which is satisfactory for most purposes.

It will be noted that it is not necessary in the preferred form of this process, in which a dry base for the final neutralization is employed, to employ washing after acid treatment or after the final alkali treatment. Such washings are objectionable in that they tend to produce emulsions which can only be broken up with considerable difficulty and loss of time. The present process is a dry process except in so far as the acid treatment is concerned, and for that reason may be carried out in a much shorter time and at less expense than would otherwise be required.

I claim:

1. The method of treating used lubricants which consists in subjecting the used lubricant to clarifying and decolorizing treatments, treating the same with a moisture-removing agent in the form of a dry powder, then treating the same with sulfuric acid, and finally neutralizing by treatment with a base.

2. The method of treating used lubricants which consists in subjecting the same to clarifying and decolorizing treatments, removing moisture which may be present in the lubricant by treatment with a dry dehydrating agent, then treating with sulfuric acid and subjecting to a neutralizing treatment with a base, and removing the base and its products.

3. The method of treating used lubricants consisting in subjecting the same to a clarifying action, removing moisture therefrom, subjecting the lubricant to the action of an adsorbent material, treating with sulfuric acid, and then neutralizing the acid and removing the products of neutralization.

4. The method of treating used lubricants which consists in removing therefrom suspended matter contained therein, treating the lubricant to remove any moisture which may be present, subjecting the same to the action of an adsorbent decolorizing material and also subjecting it to acid and neutralizing treatments.

In testimony whereof, I have hereunto set my hand.

JAMES O. HANDY.

---

It is hereby certified that in Letters Patent No. 1,295,308, granted February 25, 1919, upon the application of James O. Handy, of Pittsburgh, Pennsylvania, for an improvement in "Processes of Treating Used Lubricants," an error appears in the printed specification requiring correction as follows: Page 1, lines 45-46, for the word "absorption" read *adsorption;* and that the said Letters Patent should be read with this correction therein that the same may conform to the record of the case in the Patent Office.

Signed and sealed this 26th day of August, A. D., 1919.

[SEAL.]

M. H. COULSTON,
*Acting Commissioner of Patents.*

Cl. 196—26.